(12) United States Patent
Jang et al.

(10) Patent No.: US 10,501,623 B2
(45) Date of Patent: Dec. 10, 2019

(54) POLYCARBONATE RESIN COMPOSITION AND MOLDED ARTICLE USING THE SAME

(71) Applicant: Lotte Advanced Materials Co., Ltd., Yeosu-si (KR)

(72) Inventors: Mi Rae Jang, Uiwang-si (KR); Jung Ki Kim, Uiwang-si (KR); Yeong Deuk Seo, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 55 days.

(21) Appl. No.: 15/856,110

(22) Filed: Dec. 28, 2017

(65) Prior Publication Data

US 2018/0187006 A1    Jul. 5, 2018

(30) Foreign Application Priority Data

Dec. 30, 2016 (KR) .......... 10-2016-0184435
Nov. 16, 2017 (KR) .......... 10-2017-0153093

(51) Int. Cl.
  *C08L 69/00*     (2006.01)
(52) U.S. Cl.
  CPC .......... *C08L 69/00* (2013.01); *C08L 2205/03* (2013.01); *C08L 2205/035* (2013.01); *C08L 2207/53* (2013.01)

(58) Field of Classification Search
  None
  See application file for complete search history.

(56) References Cited

U.S. PATENT DOCUMENTS

| 9,944,790 B2 | 4/2018 | Kawakubo et al. |
| 2015/0148472 A1* | 5/2015 | Kim .................. C08K 3/34 |
| | | 524/451 |

FOREIGN PATENT DOCUMENTS

| KR | 10-2008-0045798 A | 5/2008 |
| KR | 10-2015-0013579 A | 2/2015 |
| KR | 10-2016-0130094 A | 11/2016 |
| WO | WO 2017/046126 | * 3/2017 |

* cited by examiner

*Primary Examiner* — David J Buttner
(74) *Attorney, Agent, or Firm* — Additon, Higgins & Pendleton, P.A.

(57) ABSTRACT

Disclosed herein is a polycarbonate resin composition. The polycarbonate resin composition includes: (A) 100 parts by weight of a polycarbonate resin; (B) about 1 part by weight to about 5 parts by weight of a core-shell type impact modifier having an average particle diameter (D50) of about 70 nm to about 130 nm; and (C) about 0.1 parts by weight to about 1 parts by weight of an olefin-(meth) acrylate copolymer, wherein the core-shell type impact modifier (B) includes a unit derived from a $C_1$ to $C_6$ alkyl (meth)acrylate and has a unimodal particle size distribution.

18 Claims, No Drawings

POLYCARBONATE RESIN COMPOSITION AND MOLDED ARTICLE USING THE SAME

CROSS-REFERENCE TO RELATED APPLICATION

This application claims priority under 35 USC Section 119 to and the benefit of Korean Patent Application 10-2016-0184435, filed on Dec. 30, 2016, and Korean Patent Application 10-2017-0153093, filed on Nov. 16, 2017, the entire disclosure of each of which is incorporated herein by reference.

FIELD

The present invention relates to a polycarbonate resin composition and a molded article manufactured using the same.

BACKGROUND

Polycarbonate (PC) resins, which are widely used as an interior/exterior material for electric/electronic products including mobile phones, are subjected to clear-coating or subjected to painting after injection molding so as to realize various colors and prevent generation of scratches in an actual use. However, during clear-coating or painting, a dilution solvent permeates into a polycarbonate resin, causing deterioration in mechanical properties.

Recently, the number of processes for painting after injection molding has been reduced in order to reduce process costs. Accordingly, there is a need for a polycarbonate resin having good appearance without being subjected to painting.

In other words, it is necessary to develop a polycarbonate resin which can have good properties in terms of both impact resistance and appearance regardless of performing painting.

Conventionally, there has been proposed a method in which a polycarbonate resin is blended with an expensive siloxane-polycarbonate copolymer to improve resistance after painting. However, this method has a problem of an excessive cost burden.

In addition, there has been also proposed a method in which an impact modifier is added to a polycarbonate resin to improve impact resistance after painting. However, this method has a problem in that the impact modifier is likely to be phase-separated from the resin, causing deterioration in appearance.

SUMMARY OF THE INVENTION

Embodiments provide a polycarbonate resin composition which can have good impact resistance after being subjected to painting, and a molded article manufactured using the same.

Embodiments also provide a polycarbonate resin composition which can prevent shade variation at welds upon injection molding, and a molded article manufactured using the same.

Embodiments also provide a polycarbonate resin composition which can eliminate or minimize use of additives which are phase-separable with a polycarbonate resin, thereby providing good appearance, and a molded article manufactured using the same.

Embodiments also relate to a polycarbonate resin composition which can have good properties in terms of both appearance and impact resistance after painting, and a molded article manufactured using the same.

The polycarbonate resin composition includes: 100 parts by weight of a polycarbonate resin (A); about 1 part by weight to about 5 parts by weight of a core-shell type impact modifier (B) having an average particle diameter (D50) of about 70 nm to about 130 nm; and about 0.1 parts by weight to about 1 parts by weight of an olefin-(meth) acrylate copolymer (C), wherein the core-shell type impact modifier (B) includes a unit derived from a $C_1$ to $C_6$ alkyl (meth) acrylate and has a unimodal particle size distribution.

The polycarbonate resin (A) may have a melt-flow index of about 5 g/10 min to about 50 g/10 min.

The core-shell type impact modifier (B) may be composed of a butadiene rubber core and a shell including a copolymer of a $C_1$ to $C_6$ alkyl (meth)acrylate and an aromatic vinyl monomer.

The core-shell type impact modifier (B) may have D10, D50, and D90 values (on a particle size distribution curve) satisfying Equations 2 to 4, respectively:

$$40 \text{ nm} \leq D10 \leq 50 \text{ nm} \qquad \text{[Equation 2]}$$

$$70 \text{ nm} \leq D50 \leq 130 \text{ nm} \qquad \text{[Equation 3]}$$

$$150 \text{ nm} \leq D90 \leq 160 \text{ nm} \qquad \text{[Equation 4]}.$$

The olefin-(meth)acrylate copolymer (C) may have a linear structure and a melt-flow index of about 1 g/10 min to about 5 g/10 min.

The olefin-(meth) acrylate copolymer (C) may include about 25 wt % to about 45 wt % of the unit derived from the $C_1$ to $C_6$ alkyl (meth)acrylate.

A weight ratio of the core-shell type impact modifier (B) to the olefin-(meth) acrylate copolymer (C) may range from about 2:1 to about 6:1.

The polycarbonate resin composition may satisfy Equation 1:

$$50 \text{ cm} \leq I \leq 100 \text{ cm}$$

where I indicates a height from which dropping a weight results in breakage of a 55 mm×100 mm×3 mm specimen, which is prepared by dipping in a solvent for painting for 2 minutes, drying at 70° C. for 20 minutes, and aging at room temperature for 24 hours in a DuPont drop impact test.

The polycarbonate resin composition may further include at least one additive among an antimicrobial agent, a heat stabilizer, an antioxidant, a release agent, a light stabilizer, an inorganic additive, a surfactant, a coupling agent, a plasticizer, a compatibilizer, a lubricant, an antistatic agent, a colorant, a pigment, a dye, a flame retardant, a flame retardant aid, an anti-dripping agent, a UV absorber, and a UV blocking agent.

Another embodiment relates to a molded article. The molded article is formed of the polycarbonate resin composition.

The present invention provides a polycarbonate resin composition which can have good impact resistance after being subjected to painting and can prevent shade variation at welds upon injection molding, and a molded article manufactured using the same.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

Hereinafter, embodiments of the present invention will be described in detail.

(A) Polycarbonate Resin

According to the present invention, the polycarbonate resin may be an aromatic polycarbonate resin prepared by reacting a carbonate precursor such as phosgene, halogen formate, and/or carbonic diester with one or more diphenols represented by Formula 1:

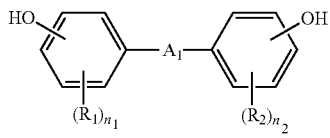

wherein $A_1$ is a single bond, a substituted or unsubstituted $C_1$ to $C_5$ alkylene group, a substituted or unsubstituted $C_2$ to $C_5$ alkylidene group, a substituted or unsubstituted $C_3$ to $C_6$ cycloalkylene group, a substituted or unsubstituted $C_5$ to $C_6$ cycloalkylidene group, CO, S, or $SO_2$, $R_1$ and $R_2$ are each independently a substituted or unsubstituted $C_1$ to $C_{30}$ alkyl group or a substituted or unsubstituted $C_6$ to $C_{30}$ aryl group, and $n_1$ and $n_2$ are each independently an integer of 0 to 4.

As used herein, the term "substituted" means that at least one hydrogen atom among functional groups of the present invention is substituted with a substituent such as a halogen, a $C_1$ to $C_{30}$ alkyl group, a $C_6$ to $C_{30}$ aryl group, a substituted or unsubstituted $C_2$ to $C_{30}$ heteroaryl group, a $C_1$ to $C_{20}$ alkoxy group, or a combination thereof.

Examples of the diphenols may include without limitation 4,4'-dihydroxybiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like, and mixtures thereof. For example, the diphenols may be 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane, for example 2,2-bis-(4-hydroxyphenyl)propane, which is also referred to as bisphenol A.

In one embodiment, the polycarbonate resin may be a branched polycarbonate resin. For example, the polycarbonate resin may be a polycarbonate resin prepared by adding a tri- or higher polyfunctional compound, for example a tri- or higher valent phenol group-containing compound, in an amount of about 0.05 parts by mole to about 2 parts by mole relative to about 100 parts by mole of the diphenols.

In one embodiment, the polycarbonate resin may be a homopolycarbonate resin, a copolycarbonate resin, or a blend thereof.

In addition, the polycarbonate resin may be partly or completely replaced by an aromatic polyester-carbonate resin obtained by polymerization in the presence of an ester precursor, for example, a bifunctional carboxylic acid.

In one embodiment, the polycarbonate resin may have a weight average molecular weight (Mw) of about 10,000 g/mol to about 200,000 g/mol, for example, about 15,000 g/mol to about 80,000 g/mol, for example, about 15,000 g/mol, about 20,000 g/mol, about 25,000 g/mol, about 30,000 g/mol, about 35,000 g/mol, about 40,000 g/mol, about 45,000 g/mol, about 50,000 g/mol, about 55,000 g/mol, about 60,000 g/mol, about 65,000 g/mol, about 70,000 g/mol, about 75,000 g/mol, or about 80,000 g/mol, as measured by gel permeation chromatography. Within this range, the polycarbonate resin composition can have good moldability and can be easy to prepare.

In one embodiment, the polycarbonate resin may have a melt-flow index (MI) of about 5 g/10 min to about 50 g/10 min, for example, about 25 g/10 min to about 35 g/10 min, as measured at 250° C. under a load of 10 kg in accordance with ISO 1133. In some embodiments, the polycarbonate resin may have a melt-flow index (MI) of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 g/10 min, as measured at 250° C. under a load of 10 kg in accordance with ISO 1133. Within this range, the polycarbonate resin composition can have good moldability. In addition, the polycarbonate resin according to the present invention may be a mixture of two or more polycarbonate resins having different melt-flow indexes.

(B) Core-Shell Type Impact Modifier

According to the present invention, the impact modifier has a core-shell structure.

In one embodiment, the core of the impact modifier includes a butadiene rubber. The impact modifier has an average particle diameter (D50) of about 70 nm to about 130 nm and has a unimodal particle size distribution. If the average particle diameter of the impact modifier exceeds about 130 nm, this can make it difficult for the polycarbonate resin composition to have good appearance despite being capable of securing impact strength of the resin composition. If the average particle diameter of the impact modifier is less than about 70 nm, this makes it difficult to secure impact strength of the polycarbonate resin composition despite allowing the resin composition to have good appearance.

In one embodiment, the impact modifier may have D10, D50, and D90 values (on a particle size distribution curve) that satisfy Equations 2 to 4, respectively.

[Equation 2]

$$40\ \text{nm} \le D10 \le 50\ \text{nm} \quad (2)$$

[Equation 3]

$$70\ \text{nm} \le D50 \le 130\ \text{nm} \quad (3)$$

[Equation 4]

$$150\ \text{nm} \le D90 \le 160\ \text{nm} \quad (4)$$

When the D10, D50, and D90 values of the impact modifier satisfy Equations 2 to 4, respectively, the polycarbonate resin composition can have good properties in terms of both impact strength and appearance.

The shell of the impact modifier includes a unit derived from a $C_1$ to $C_6$ alkyl (meth)acrylate. In one embodiment, the shell may include a copolymer of a $C_1$ to $C_6$ alkyl (meth)acrylate and an aromatic vinyl monomer.

In the core-shell type impact modifier (B), a weight ratio of the core to the shell may range from about 1:0.3 to about 1:0.7, for example, 1:0.3, 1:0.4, 1:0.5, 1:0.6, or 1:0.7. Within this range, the impact modifier can have good compatibility with the polycarbonate resin and provide good impact modification.

The core-shell type impact modifier (B) may be present in an amount of about 1 part by weight to about 5 parts by weight relative to about 100 parts by weight of the polycarbonate resin (A). In some embodiments, the polycarbonate resin composition may include the core-shell type impact modifier in an amount of about 1, 1.5, 2, 2.5, 3, 3.5, 4, 4.5, or 5 parts by weight. Further, according to some embodiments of the present invention, the core-shell type impact modifier may be present in an amount of from about any of the foregoing amounts to about any other of the foregoing amounts. Within this range, the polycarbonate resin composition can have good impact resistance and shade variation at the welds can be reduced. If the amount of the core-shell type impact modifier (B) is less than about 1 part by weight, it can be difficult to secure impact resistance of the polycarbonate resin composition, whereas if the amount of the core-shell type impact modifier (B) exceeds about 5 parts by weight, shade variation can occur at welds upon injection molding of the resin composition, causing deterioration in appearance.

(C) Olefin-(Meth) Acrylate Copolymer

According to the present invention, the olefin-(meth) acrylate copolymer (C) has a linear structure. When the olefin-(meth) acrylate copolymer has a linear structure, the olefin-(meth) acrylate copolymer can have improved miscibility with the polycarbonate resin and improve flowability of the resin composition, thereby reducing stress concentration in a specific region of a molded article during injection molding.

In one embodiment, the olefin-(meth) acrylate copolymer (C) may include a unit derived from a $C_1$ to $C_6$ alkyl (meth)acrylate in an amount of about 25 wt % to about 45 wt %, for example, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %. Further, according to some embodiments of the present invention, the unit derived from a $C_1$ to $C_6$ alkyl (meth)acrylate may be present in an amount of from about any of the foregoing amounts to about any other of the foregoing amounts. Within this range, the olefin-(meth) acrylate copolymer (C) can have further improved miscibility with the polycarbonate resin and further improve flowability of the resin composition.

In one embodiment, the olefin-(meth) acrylate copolymer (C) may have a melt-flow index (MI) of about 1 g/10 min to about 5 g/10 min, for example about 2.5 g/10 min to about 4.5 g/10 min, as measured at 190° C. under a load of 2.16 kg in accordance with ASTM D1238. In some embodiments, the olefin-(meth) acrylate copolymer (C) may have a melt-flow index (MI) of about 1 g/10 min, 1.1 g/10 min, 1.2 g/10 min, 1.3 g/10 min, 1.4 g/10 min, 1.5 g/10 min, 1.6 g/10 min, 1.7 g/10 min, 1.8 g/10 min, 1.9 g/10 min, 2 g/10 min, 2.1 g/10 min, 2.2 g/10 min, 2.3 g/10 min, 2.4 g/10 min, 2.5 g/10 min, 2.6 g/10 min, 2.7 g/10 min, 2.8 g/10 min, 2.9 g/10 min, 3.0 g/10 min, 3.1 g/10 min, 3.2 g/10 min, 3.3 g/10 min, 3.4 g/10 min, 3.5 g/10 min, 3.6 g/10 min, 3.7 g/10 min, 3.8 g/10 min, 3.9 g/10 min, 4.0 g/10 min, 4.1 g/10 min, 4.2 g/10 min, 4.3 g/10 min, 4.4 g/10 min, 4.5 g/10 min, 4.6 g/10 min, 4.7 g/10 min, 4.8 g/10 min, 4.9 g/10 min, or 5 g/10 min, as measured at 190° C. under a load of 2.16 kg in accordance with ASTM D1238. Within this range, the polycarbonate resin composition can have good properties in terms of appearance and impact resistance after painting.

The olefin-(meth) acrylate copolymer (C) may be present in an amount of about 0.1 parts by weight to about 1 part by weight relative to about 100 parts by weight of the polycarbonate resin (A). In some embodiments, the polycarbonate resin composition may include the olefin-(meth) acrylate copolymer in an amount of about 0.1, 0.2, 0.3, 0.4, 0.5, 0.6, 0.7, 0.8, 0.9, or 1 parts by weight. Further, according to some embodiments of the present invention, the olefin-(meth) acrylate copolymer may be present in an amount of from about any of the foregoing amounts to about any other of the foregoing amounts. Within this range, shade variation at welds upon injection molding can be further prevented and the resin composition can have good impact strength. If the amount of the olefin-(meth) acrylate copolymer (C) is less than about 0.1 parts by weight, it may be difficult to secure impact resistance after painting. If the amount of the olefin-(meth) acrylate copolymer (C) exceeds about 1 part by weight, shade variation can occur at welds upon injection molding, causing deterioration in appearance, although the resin composition has good impact resistance.

In one embodiment, a weight ratio of the core-shell type impact modifier (B) to the olefin-(meth) acrylate copolymer (C) may range from about 2:1 to about 6:1, for example, 2:1, 3:1, 4:1, 5:1, or 6:1. Within this range, the resin composition can have good properties in terms of appearance and impact resistance.

The polycarbonate resin composition according to the present invention may further include one or more additives without altering the effects of the present invention, as needed. Examples of the additive may include an antimicrobial agent, a heat stabilizer, an antioxidant, a release agent, a light stabilizer, an inorganic additive, a surfactant, a coupling agent, a plasticizer, a compatibilizer, a lubricant, an antistatic agent, a colorant, a pigment, a dye, a flame retardant, a flame retardant aid, an anti-dripping agent, a UV absorber, a UV blocking agent, and combinations thereof, without being limited thereto. Since the additive is likely to be phase-separated from the polycarbonate resin, the additive is preferably used in a minimum quantity.

In one embodiment, the polycarbonate resin composition may satisfy Equation 1:

$$50 \text{ cm} \leq I \leq 100 \text{ cm} \quad (1)$$

wherein I indicates a height from which dropping a weight results in breakage of a 55 mm×100 mm×3 mm specimen, which is prepared by dipping in a solvent for painting for 2 minutes and drying at 70° C. for 20 minutes, followed by aging at room temperature for 24 hours, in a DuPont drop impact test.

In accordance with another embodiment, a molded article is formed by any suitable molding method, such as injection molding, double injection molding, blowing, extruding, and compression molding, using the thermoplastic resin composition according to the present invention. The molded article can be easily formed by a person having ordinary skill in the art to which the present invention pertains. The molded article may be used in various applications including without limitation electric/electronic products, automobile parts, and the like.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Polycarbonate Resin

A polycarbonate resin, SC-1190 (Lotte Advanced Materials Co., Ltd.)

(B) Core-Shell Type Impact Modifier (b1) A core-shell type impact modifier, M732 (KANEKA Co., Ltd., particle size distribution: unimodal distribution, average particle diameter: 100 nm)

(b2) A core-shell type impact modifier, C-223A (MRC Co., Ltd., particle size distribution: bimodal distribution, average particle diameter: 100 nm and 300 nm)

(b3) A core-shell type impact modifier, EXL2650A (DOW Chemical Co., Ltd., particle size distribution: unimodal distribution, average particle diameter: 50 nm)

(b4) A core-shell type impact modifier, S-2100 (MRC Co., Ltd., particle size distribution: unimodal distribution, average particle diameter: 300 nm)

(C) Olefin-(meth) acrylate Copolymer

An ethylene-methyl acrylate copolymer containing 30 wt % of methyl acrylate and having a melt-flow index of 3 g/10 min, as measured at 190° C. under a load of 2.16 kg according to ASTM D1238.

Examples 1 to 3 and Comparative Examples 1 to 7

The aforementioned components are dry-mixed in amounts as listed in Tables 1 and 2, followed by melt extrusion at a barrel temperature of 250° C. to 260° C. using a twin-screw extruder (L/D=36, φ 45 mm), thereby preparing a thermoplastic resin composition in pellet form. The prepared pellets are dried in a hot-air dryer at 100° C. for 4 hours, followed by injection molding at an injection temperature of 300° C., thereby preparing a specimen.

The prepared specimen is evaluated as to the following properties.

Property Evaluation (1) Impact resistance after painting (cm): a 55 mm×100 mm×3 mm specimen is dipped in a solvent for painting obtained by mixing a ketone with alcohol and acetone for 2 minutes, followed by drying at 70° C. for 20 minutes, and then subjected to aging at room temperature for 24 hours. Then, a height from which dropping a weight results in breakage of the specimen is measured in accordance with a DuPont drop impact test.

(2) Shade variation at welds: The prepared pellets of each of Examples and Comparative Examples are subjected to injection molding using a mold causing formation of welds. Then, shade variation at the welds is observed with the naked eye, followed by evaluation according to the following criteria:

O: Shade variation at welds is observed.

X: No shade variation at welds is observed.

TABLE 1

|  | Example | | |
|---|---|---|---|
|  | 1 | 2 | 3 |
| (A) Polycarbonate resin | 100 | 100 | 100 |
| (B) Core-shell type impact modifier (b1) | 3 | 3 | 5 |
| (C) Olefin-(meth)acrylate copolymer | 0.5 | 1 | 1 |
| Impact resistance after painting | 55 | 60 | 75 |
| Shading at weld | X | X | X |

TABLE 2

|  |  | Comparative Example | | | | | | |
|---|---|---|---|---|---|---|---|---|
|  |  | 1 | 2 | 3 | 4 | 5 | 6 | 7 |
| (A) Polycarbonate resin |  | 100 | 100 | 100 | 100 | 100 | 100 | 100 |
| (B) Core-shell type impact modifier | (b1) | 3 | 3 | 3 | 6 | — | — | — |
|  | (b2) | — | — | — | — | 3 | — | — |
|  | (b3) | — | — | — | — | — | 3 | — |
|  | (b4) | — | — | — | — | — | — | 3 |
| (C) Olefin-(meth)acrylate copolymer |  | — | 1.5 | 2 | 1 | 1 | 1 | 1 |
| Impact resistance after painting |  | 40 | 65 | 75 | 70 | 65 | 35 | 70 |
| Shade variation at welds |  | X | O | O | O | O | X | O |

As shown in Tables 1 and 2, it is confirmed that the polycarbonate resin compositions of Examples 1 to 3 have good properties in terms of both appearance and impact resistance after painting. Conversely, the polycarbonate resin composition of Comparative Example 1 free from the olefin-(meth) acrylate copolymer (C) exhibits poor impact resistance after painting, and the polycarbonate resin compositions of Comparative Examples 2 and 3 using an excess of the olefin-(meth) acrylate copolymer (C) suffer from shade variation at welds upon injection molding and thus exhibit poor properties in terms of appearance. In addition, the polycarbonate resin composition of Comparative Example 4 using an excess of the core-shell type impact modifier (B) exhibits poor properties in terms of appearance, and the polycarbonate resin composition of Comparative Example 5 using a core-shell type impact modifier having a bimodal particle size distribution exhibits poor properties in terms of appearance. Further, the polycarbonate resin composition of Comparative Example 6 using a core-shell type impact modifier having an average particle diameter of about 50 nm exhibits poor impact resistance. Moreover, the polycarbonate resin composition of Comparative Example 7 using a core-shell type impact modifier having an average particle diameter outside the range according to the present invention exhibits poor properties in terms of appearance.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A polycarbonate resin composition comprising:
    (A) 100 parts by weight of a polycarbonate resin;
    (B) about 1 part by weight to about 5 parts by weight of a core-shell type impact modifier having an average particle diameter (D50) of about 70 nm to about 130 nm; and
    (C) about 0.1 parts by weight to about 1 part by weight of an olefin-(meth) acrylate copolymer,
    wherein the core-shell type impact modifier (B) comprises a butadiene rubber core, comprises a unit derived from a $C_1$ to $C_6$ alkyl (meth)acrylate and has a unimodal particle size distribution.

2. The polycarbonate resin composition according to claim 1, wherein the polycarbonate resin (A) has a melt-flow index of about 5 g/10 min to about 50 g/10 min. measured at 250° C. under a load of 10 kg in accordance with ISO 1133.

3. The polycarbonate resin composition according to claim 1, wherein the core-shell type impact modifier (B) comprises a shell comprising a copolymer of a $C_1$ to $C_6$ alkyl (meth)acrylate and an aromatic vinyl monomer.

4. The polycarbonate resin composition according to claim 1, wherein the core-shell type impact modifier (B) has D10, D50, and D90 values on a particle size distribution curve satisfying Equations 2 to 4, respectively:

$$40 \text{ nm} \leq D10 \leq 50 \text{ nm} \quad \text{[Equation 2]}$$

$$70 \text{ nm} \leq D50 \leq 130 \text{ nm} \quad \text{[Equation 3]}$$

$$150 \text{ nm} \leq D90 \leq 160 \text{ nm}. \quad \text{[Equation 4]}$$

5. The polycarbonate resin composition according to claim 1, wherein the olefin-(meth)acrylate copolymer (C) has a linear structure and a melt-flow index of about 1 g/10 min to about 5 g/10 min. measured at 190° C. under a load of 2.16 kg in accordance with ASTM D1238.

6. The polycarbonate resin composition according to claim 1, wherein the olefin-(meth) acrylate copolymer (C) comprises about 25 wt % to about 45 wt % of the unit derived from the $C_1$ to $C_6$ alkyl (meth)acrylate.

7. The polycarbonate resin composition according to claim 1, wherein a weight ratio of the core-shell type impact modifier (B) to the olefin-(meth) acrylate copolymer (C) ranges from about 2:1 to about 6:1.

8. The polycarbonate resin composition according to claim 1, wherein the polycarbonate resin composition satisfies Equation 1:

$$50 \text{ cm} \leq I \leq 100 \text{ cm}$$

where I indicates a height from which dropping a weight results in breakage of a 55 mm×100 mm×3 mm specimen in a DuPont drop impact test, the specimen being prepared by dipping in a solvent for painting for 2 minutes and drying at 70° C. for 20 minutes, followed by aging at room temperature for 24 hours.

9. The polycarbonate resin composition according to claim 1, further comprising:
at least one additive comprising an antimicrobial agent, a heat stabilizer, an antioxidant, a release agent, a light stabilizer, an inorganic additive, a surfactant, a coupling agent, a plasticizer, a compatibilizer, a lubricant, an antistatic agent, a colorant, a pigment, a dye, a flame retardant, a flame retardant aid, an anti-dripping agent, a UV absorber, and/or a UV blocking agent.

10. A molded article formed of the polycarbonate resin composition according to claim 1.

11. A polycarbonate resin composition comprising:
(A) 100 parts by weight of a polycarbonate resin;
(B) about 1 part by weight to about 5 parts by weight of a core-shell type impact modifier having an average particle diameter (D50) of about 70 nm to about 130 nm; and
(C) about 0.1 parts by weight to about 1 part by weight of an olefin-(meth) acrylate copolymer,
wherein the core-shell type impact modifier (B) comprises a unit derived from a $C_1$ to $C_6$ alkyl (meth)acrylate and has a unimodal particle size distribution, and
wherein the core-shell type impact modifier (B) has D10, D50, and D90 values on a particle size distribution curve satisfying Equations 2 to 4, respectively:

$$40 \text{ nm} \leq D10 \leq 50 \text{ nm} \quad \text{[Equation 2]}$$

$$70 \text{ nm} \leq D50 \leq 130 \text{ nm} \quad \text{[Equation 3]}$$

$$150 \text{ nm} \leq D90 \leq 160 \text{ nm}. \quad \text{[Equation 4]}$$

12. The polycarbonate resin composition according to claim 11, wherein the polycarbonate resin (A) has a melt-flow index of about 5 g/10 min to about 50 g/10 min, as measured at 250° C. under a load of 10 kg in accordance with ISO 1133.

13. The polycarbonate resin composition according to claim 11, wherein the olefin-(meth)acrylate copolymer (C) has a linear structure and a melt-flow index of about 1 g/10 min to about 5 g/10 min, as measured at 190° C. under a load of 2.16 kg according to ASTM D1238.

14. The polycarbonate resin composition according to claim 11, wherein the olefin-(meth) acrylate copolymer (C) comprises about 25 wt % to about 45 wt % of the unit derived from the $C_1$ to $C_6$ alkyl (meth)acrylate.

15. The polycarbonate resin composition according to claim 11, wherein a weight ratio of the core-shell type impact modifier (B) to the olefin-(meth) acrylate copolymer (C) ranges from about 2:1 to about 6:1.

16. The polycarbonate resin composition according to claim 11, wherein the polycarbonate resin composition satisfies Equation 1:

$$50 \text{ cm} \leq I \leq 100 \text{ cm}$$

where I indicates a height from which dropping a weight results in breakage of a 55 mm×100 mm×3 mm specimen in a DuPont drop impact test, the specimen being prepared by dipping in a solvent for painting for 2 minutes and drying at 70° C. for 20 minutes, followed by aging at room temperature for 24 hours.

17. The polycarbonate resin composition according to claim 11, further comprising:
at least one additive comprising an antimicrobial agent, a heat stabilizer, an antioxidant, a release agent, a light stabilizer, an inorganic additive, a surfactant, a coupling agent, a plasticizer, a compatibilizer, a lubricant, an antistatic agent, a colorant, a pigment, a dye, a flame retardant, a flame retardant aid, an anti-dripping agent, a UV absorber, and/or a UV blocking agent.

18. A molded article formed of the polycarbonate resin composition according to claim 11.

* * * * *